United States Patent [19]

Eckhardt et al.

[11] Patent Number: 4,835,243

[45] Date of Patent: May 30, 1989

[54] THERMOTROPIC AROMATIC POLYMERS WITH HIGH ELONGATION AT BREAK, PROCESSES FOR THEIR PREPARATION AND THEIR USE FOR THE PRODUCTION OF MOULDED ARTICLES, FILAMENTS, FIBRES AND FILMS

[76] Inventors: Volker Eckhardt; Hans-Rudolf Dicke, both of c/o Bayer Aktiengesellschaft, P.O. Box 166, D 4150 Krefeld-Uerdingens; Erich Hammerschmidt, c/o Bayer Aktiengesellschaft, D 5090 Leverkusen; Ludwig Bottenbruch, c/o Bayer Aktiengesellschaft, P.O. Box 166, D 4150 Krefeld-Uerdingen; Frank Kleiner; Heinz-Ulrich Blank, both of c/o Bayer Aktiengesellschaft, D 5090 Leverkusen, all of Fed. Rep. of Germany

[21] Appl. No.: 205,819

[22] Filed: Jun. 13, 1988

[30] Foreign Application Priority Data

Jun. 26, 1987 [DE] Fed. Rep. of Germany ....... 3721055

[51] Int. Cl.$^4$ .................. C08G 63/18; C08G 63/60; C08J 5/18; D01F 6/62

[52] U.S. Cl. .................. 528/176; 528/180; 528/181; 528/191; 528/193; 528/481; 528/503

[58] Field of Search .......................... 528/176

[56] References Cited

U.S. PATENT DOCUMENTS

| 4,390,681 | 6/1983 | Deex | 528/176 |
| 4,539,386 | 9/1985 | Yoon | 528/176 |
| 4,626,584 | 12/1986 | Stackman et al. | 528/176 |
| 4,654,412 | 3/1987 | Calundann et al. | 528/176 |
| 4,663,422 | 5/1987 | Inoue et al. | 528/176 |
| 4,667,011 | 5/1987 | Eckhardt et al. | 528/176 |
| 4,742,149 | 5/1988 | Finestone | 528/176 |

FOREIGN PATENT DOCUMENTS 0072540 2/1983 European Pat. Off. .

OTHER PUBLICATIONS

Chemical Abstracts vol. 98, 1983, 199754a.

*Primary Examiner*—Harold D. Anderson
*Assistant Examiner*—T. Mason

[57] ABSTRACT

Thermotropic, fully aromatic polyesters based on p-hydroxybenzoic acid, aromatic dicarboxylic acid and diphenol in which the dicarboxylic acid groups consist at least in part of 3,3'-diphenyldicarboxylic acid groups have excellent mechanical properties, in particular excellent elongation at break.

7 Claims, No Drawings

THERMOTROPIC AROMATIC POLYMERS WITH HIGH ELONGATION AT BREAK, PROCESSES FOR THEIR PREPARATION AND THEIR USE FOR THE PRODUCTION OF MOULDED ARTICLES, FILAMENTS, FIBRES AND FILMS

This invention relates to high molecular weight thermotropic, fully aromatic polyesters with excellent mechanical properties, in particular excellent elongation at break, to a process for their preparation and to their use for the production of moulded articles, filaments, fibres and films.

"Thermotropic" is the term used to denote substances which form liquid crystalline melts. Thermotropic polycondensates are well known, see e.g.

F. E. McFarlane et al., Liquid Crystal Polymers II, Contemporary Topics in Polymer Science, Vol. 2, Plenum Publishing Corporation, 1977;

W. J. Jackson and H.F. Kuhfuss, J. Polymer Science, Polymer Chem. Ed. 14, 2042 (1976);

W. C. Wooten et al. in A. Ciferri "Ultra-high Modulus Polymers", Applied Science Publ., London 1979, p 362 et seq., A. Blumstein et al., "Liquid Crystalline Order in Polymers", Academic Press 1978;

J. Preston, Angew. Makromol. Chem. 109/110, p. 1-19 (1982);

A. Ciferri, W.R. Krigbaum R.B. Meyer "Polymer Liquid Crystals", Academic Press, New York, 1982;

M. G. Dobb and J.E. McIntyre, Advances in Polymer Science 60/61, Springer-Verlag, Berlin 1984;

EP 1185, 1340, 8855, 11 640, 15 856, 17 310, 18 145, 18 709, 22 344, 44 205, 49 615,131 846, 132 637, 134 956, 134 959, 141 320, 165 399, 170 935, 189 073; US 3 991 013, 3 991 014, 4 066 620, 4 067 852, 4 083 829, 4 107 143; WO 79/797, 79/1030, 79/1040.

The liquid-crystalline state of polymer melts may be investigated with a polarisation microscope. For these investigations, the eye piece was equipped with an attachment containing a photoelectric diode at the focal point of the eye piece. A measurement amplifier with control device attached to the microscope was used to adjust the value measured with the microscope switched on in the absence of a material sample and with Nicols prisms arranged in parallel to 100 scale divisions. With crossed Nicols prisms, the value obtained was then 0.01 scale divisions.

The thickness of the layers of polyester melt investigated was 100 μm.

Investigation of the polyesters was carried out after the samples had been melted at temperatures from 280° to 400° C. If the melt between the crossed Nicols prisms was observed to brighten in any part or all of this temperature range, the polyester was classified as thermotropic, liquid-crystalline.

In the measuring arrangement used, the liquid crystalline polyesters give values above one scale division, in most cases from 3 to 90 scale divisions. Amorphous substances, on the other hand, e.g. aromatic polycarbonates, give values below 0.1 scale division.

The method described above is particularly suitable for a rapid determination in the laboratory and gives unequivocal results in almost all cases. In cases of doubt it may be advisable to confirm the presence of liquid crystalline components by X-ray wide angle scattering in the melt as described e.g. in "Plastic Crystals, Physico-Chemical Properties and Methods of Investigation" by G.W. Gray and P.A. Windsor, in particular Chapter 3, John Wiley and Sons, New York, Sidney, Toronto 1974.

Moulded articles produced from liquid-crystalline melts of fully aromatic polyesters have mechanical strength and stiffness properties such as are normally not found in unreinforced polyesters processed from isotropic melts but the elongation at break of such articles is not entirely satisfactorily.

Materials with high elongation at break values are, however, required for many applications, e.g. in the field of optoelectronics.

It was therefore an object of the present invention to provide thermotropic, fully aromatic polyesters with excellent mechanical properties, in particular excellent elongation at break, It has now surprisingly been found that fully aromatic polyesters containing condensed residues of p-hdroxybenzoic acid, 3,3'-diphenyl-dicarboxylic acid and certain diphenols have the required advantageous properties.

This invention relates to thermotropic, fully aromatic polyesters containing recurrent units corresponding to the following formulae:

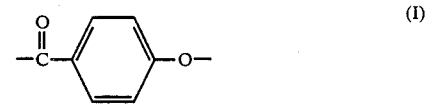 (I)

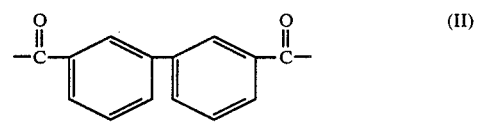 (II)

and

 (III)

wherein Ar consists to an extent of 0 to 100 mol-%, preferably 50 to 80 mol-%, of 1,4-phenylene groups and 100 to 0 mol-%, preferably 50 to 20 mol-% of other bivalent aromatic groups which have 6 to 18 carbon atoms and in which from 50 to 100 mol-% of the chain lengthening bonds are coaxial or arranged parallel in opposite directions and from 50 to 0 mol-% are bent at an angle and which may be substituted with $C_1$–$C_4$-alkoxy groups or halogen atoms, under the condition that the molar ratio of I:II is from 0.1 to 4.0, preferably from 0.5 to 3.0, in particular from 0.75 to 1.5, and the molar ratio of II:III is from 0.95 to 1.05, preferably from 0.98 to 1.02, in particular 1.0.

If the diphenols contain groups Ar in which the chain lengthening bonds are bent at an angle or which are substituted, they will not be used in such a large quantity that the thermotropic properties of the resulting polyesters will be lost.

The following are examples of preferred diphenols resulting in units III in which Ar is not a 1,4-phenylene group: 4,4'-Dihydroxydiphenyl, 1,4-, 1,5-, 2,6- and 2,7-naphthalenediol, chlorohydroquinone, methyl hydroquinone, phenyl hydroquinone, resorcinol, bisphenol-A,o,o,o', o'-tetramethyl-, -chloro- and -bromo-diphenol-A, 4,4'-dihydroxy-diphenylketone, 4,4'-dihydroxy-diphenylsulphide and mixtures of the said compounds. 4,4'-Dihydroxydiphenyl is particularly preferred.

Up to 10% of the units II in the polyesters according to the invention may be replaced by other dicarboxylic acid groups in which the chain lengthening bonds are coaxial or arranged parallel in opposite directions or bent at an angle. The dicarboxylic acids used which result in such groups are preferably terephthalic acid, isophthalic acid, 4,4'-diphenyl-dicarboxylic acid, 4,4'-terphenyldicarboxylic acid, 2,6-, 1,4-, 1,5- and 2,7-naphthalene dicarboxylic acid, azobenzene dicarboxylic acid, stilbene dicarboxylic acid, tolanedicarboxylic acid, 4,4'- and 3,4'-diphenylether dicarboxylic acid, 4,4'- and 3,4'-benzophenone dicarboxylic acid and methyl-, ethyl-, phenyl- and chloroterephthalic acid.

The polyesters according to the invention may contain up to 10 mol-% of carbonate groups, based on the sum of ester and carbonate groups, but they are preferably free from carbonate groups.

The polyesters according to the invention may contain the groups I and the units of the groups II and III in random distribution or in blocks.

The polyesters according to the invention may be terminated with COOH, H, OH, $OC_6H_5$ or acyloxy groups or with groups derived from chain breaking agents. The chain breaking agents are preferably monofunctional aromatic hydroxyl compounds such as 4-hydroxydiphenyl, p-nonylphenol, 4-(1,1,3,3-tetramethylbutyl)-phenol, β-naphthol and aromatic monocarboxylic acids such as diphenylcarboxylic acids and naphthalene carboxylic acids. Chain breaking agents may be used in quantities of from 0.5 to 5 mol-% which in the case of carboxylic acids are based on the sum of groups I and II and in the case of phenols are based on groups I and III.

Branching trifunctional or higher functional, preferably aromatic monomers are used in quantities of 0.1 to 1.0 mol-%, based on the sum of groups I, II and III. Examples are: Phloroglucinol, 1,3,5-benzene-tricarboxylic acid and 3,5-dihydroxy-benzoic acid.

The polyesters according to the invention generally have an inherent viscosity of at least 0.5, preferably at least 1.0 dl/g (determined on a solution of 5 mg of polyester/ml of p-chlorophenol at 45° C.). If the polyesters are insoluble in p-chlorophenol, it is assumed that they have the required minimum viscosity. They are then in accordance with the invention, provided they satisfy the parameters of the main claim.

The polyesters according to the invention preferably have a melt viscosity of less than 1000 Pa.s, determined at a shear rate of $10^3 sec^{-1}$, using a nozzle with a length-/diameter ratio of 20 at a temperature below 370° C.

The polyesters according to the invention may be prepared by various processes, e.g. by condensation or transesterification of the hydroxycarboxylic acids, dicarboxylic acids or diphenols derived from the groups I, II and III or of their reactive derivatives, followed by polycondensation.

Their aryl esters, acyl esters and acid chlorides are examples of preferred starting compounds.

According to a preferred method of synthesis, the lower acyl esters, preferably acetates, of the hydroxycarboxylic acids or diphenols derived from the groups I and III are reacted with the dicarboxylic acids derived from the groups II, the acyl esters being optionally prepared in situ.

These reactions may be carried out in the melt phase but they may also be carried out in the presence of a liquid heat conductive medium with a high boiling point.

The groups I, II and III are incorporated in the polyesters in the proportions of the starting components.

It may be advantageous to catalyse both the condensation and transesterification reactions and the polycondensation reactions. The known catalysts for this purpose are e.g. Lewis acids and hydrohalic acids; oxides, hydrides, hydroxides, halides, alcoholates, phenolates, salts of inorganic or organic acids (preferably carboxylic acid salts), complex salts or mixed salts of the alkaline earth metals such as magnesium or calcium, of the subgroup elements such as vanadium, titanium, manganese, cobalt, nickel, zinc, lanthanum, cerium or zirconium or of elements from other groups of the Periodic System, such as germanium, tin, lead or antimony, or the alkali metal or alkaline earth metals as such, specific examples being sodium, sodium hydroxide, lithium acetate, sodium acetate, potassium acetate, calcium acetate, magnesium acetate, cobalt acetate, zinc acetate, calcium benzoate, magnesium acetyl acetonate, zinc acetyl acetonate, vanadyl-$C_1$-$C_8$-alkoxides, titanium alkoxides such as titanium tetrabutylate, titanium tetrapropylate, alkoxy titanium silicates, zirconium butylate, zirconium propylate, titanium tetraphenolate, sodium phenolate, germanium dioxide, antimony trioxide, dialkyl and diaryl tin oxide, dibutyl tin diacetate and dibutyl dimethoxy tin.

The catalysts are preferably used in quantities of from 0.001 to 1% by weight, in particular from 0.01 to 0.2% by weight, based on the total weight of the monomers used.

The polyesters according to the invention may be prepared at temperatures from 150° to 370° C., the reaction being generally started at a low temperature and the temperature being continuously raised as the reaction progresses. A vacuum may be applied as the reaction slows down, the pressure being preferably lowered continuously from normal pressure to about 0.1 mbar.

The product obtained may be subjected as a granulate or powder to a solid phase after-condensation at reduced pressure at temperatures from 150° to 300° C. After 1 to 25 hours the molecular weight has increased and the properties of the polyester have considerably improved.

The invention also relates to a process for the preparation of the new polyesters by a reaction of the hydroxy carboxylic acids, dicarboxylic acids and diphenols derived from groups I, II and III or of their reactive derivatives, which may also be prepared in situ, the reaction being optionally carried out in the presence of catalysts, chain breaking agents and branching agents at temperatures from 150° to 370° C., optionally at reduced pressure.

The thermotropic polyesters according to the invention may be processed from the melt to form injection moulded parts, filaments, fibres, bands and films. In these products, the shearing forces during the processing operations give rise to a molecular orientation which depends on a large extent on the magnitude of these forces. They also have a marked structural viscosity, that is to say the melt viscosity drops sharply with increasing shearing forces. Suitable processing methods are injection moulding, extrusion, pultrusion, compression moulding, theremoforming and melt spinning.

Due to their outstanding chemical resistance and flame resistance, the polyesters according to the invention are particularly suitable for the production of sheaths for beam wave guides, electrotechnical articles such as insulators, conductor plates for printed circuits, contact plugs, sheaths for integrated circuits, and parts of mountings and fittings, parts for industrial chemical installations, such as pipes, container linings, rotors, friction bearings, seals and filling bodies, parts for the interior fittings of aircraft, and parts of medicotechnical apparatus such as parts of air conditioning plants and valves.

The polyesters according to the invention may also be used as coating materials (pulverulent or dispersed). They are also eminently suitable for the preparation of reinforced or filled moulding compounds containing from 5 to 65% by weight of reinforcing materials or fillers based on the reinforced or filled moulding compounds.

The invention further relates to the use of the new polyesters for the production of moulded articles, filaments, fibres and films.

EXAMPLES

The elongation at break $\epsilon_R$ was determined according to DIN 53 455 (ISO/R 527).

EXAMPLE 1

The following substances were weighed into a 1 l ground glass vessel which had been annealed and rinsed with nitrogen and was fitted with a ground glass lid, a stirrer, a nitrogen inlet tube and a Vigreux column with distillation attachment:

0.50 mol≙69.1 g p-hydroxybenzoic acid,
0.50 mol≙121.1 g 3,3'-diphenyldicarboxylic acid,
0.33 mol≙63.3 g hydroquinone,
0.17 mol≙31.7 g 4,4'-dihydroxydiphenyl,
1.65 mol≙168.5 g acetic acid anhydride,
0.05 g magnesium acetate and
0.05 g germanium dioxide.

The reaction mixture was heated to 200° C. by means of a salt bath under an atmosphere of nitrogen. The major portion of acetic acid (about 180 g) was then distilled off over a period of 5 hours by stepwise raising of the bath temperature of 325° C. To complete the reaction, the pressure was lowered stepwise to 20 mbar in the course of a further hour. During this vacuum phase the viscosity of the resulting polymer melt rose sharply. The melt was therefore stirred more slowly. A total quantity of 194.6 g of acetic acid (containing excess acetic anhydride) had been collected by the end of this phase.

The pale beige reaction product which had an inherent viscosity of 1.2 dl/g was ground and subjected to a solid phase after-condensation reaction at 250° C. (15 hours at a pressure of 1 mbar). the resulting polyester was insoluble in p-chlorophenol and had an optically anisotropic melt phase in the region of 280° to 400° C.

EXAMPLES 2-9

The reaction apparatus described in Example 1 and the process described there were employed for preparing the polyesters listed in Table 1.

TABLE 1

| Example | PHB (mol %) | 3,3'-DDC (mol %) | Hy (mol %) | Co-bisphenol Type | Co-bisphenol Content (mol %) | Inherent viscosity* (dl/g) | anisotropic phase (°C.) |
| --- | --- | --- | --- | --- | --- | --- | --- |
| 2 | 60 | 40 | 26 | DOD | 14 | 1.16 | 270–400 |
| 3 | 70 | 30 | 20 | DOD | 10 | 1.69 | 290–400 |
| 4 | 75 | 25 | 16 | DOD | 9 | 1.65 | 295–400 |
| 5 | 60 | 40 | 20 | DOD | 20 | 1.03 | 280–400 |
| 6 | 60 | 40 | 14 | DOD | 26 | 1.54 | 300–400 |
| 7 | 60 | 40 | 30 | DOD | 10 | 1.02 | 290–400 |
| 8 | 60 | 40 | 26 | DODE | 14 | 1.48 | 270–400 |
| 9 | 60 | 40 | 26 | RES | 14 | 1.72 | 285–400 |

PHB = p-hydroxybenzoic acid
3,3'-DDC = 3,3'-diphenyl-dicarboxylic acid
Hy = hydroquinone
DOD = 4,4'-dihydroxy-diphenyl
DODE = 4,4'-dihydroxy-diphenylether
RES = resorcinol
*prior to solid phase after-condensation (all after-condensation products contained insoluble components)

To test the elongation at break, tension test bars were produced by injection moulding from the polyesters of Examples 1 to 9. The polyesters were processed at temperatures from 290° to 330° C. The values measured are shown in Table 2.

TABLE 2

| Example | $\epsilon_R$(%) |
| --- | --- |
| 1 | 3.0 |
| 2 | 3.0 |
| 3 | 2.6 |
| 4 | 2.0 |
| 5 | 2.9 |
| 6 | 2.5 |
| 7 | 2.4 |
| 8 | 2.7 |
| 9 | 2.9 |

What is claimed is:

1. Thermotropic, fully aromatic polyester containing recurrent units corresponding to the following formulae:

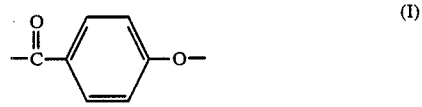

(I)

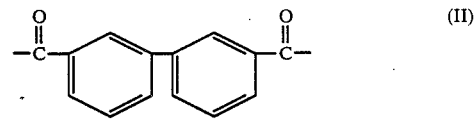

(II)

and

—O—Ar—O— (III)

wherein Ar consists of 0 to 100 mol-% of 1,4-phenylene groups and 100 to 0 mol-% of other bivalent aromatic groups which have from 6 to 18 carbon atoms and in which from 50 to 100 mol-% of the chain lengthening bonds are coaxial or arranged parallel in opposite directions and from 50 to 0 mol-% are bent at an angle and are unsubstituted or substituted with $C_1$–$C_4$-alkoxy groups or halogen atoms, under the condition that the molar ratio of I/II is from 0.1 to 4.0 and the molar ratio of II/III is from 0.95 to 1.05.

2. Polyester according to claim 1, characterised in that the molar ratio of I/II is from 0.5 to 3.0.

3. Polyester according to claim 1 characterised in that the molar ratio of I/II is from 0.75 to 1.5.

4. Polyester according to claim 1 characterised in that from 50 to 80 mol-% of Ar consists of a 1,4-phenylene group and from 50 to 20 mol-% of Ar consists of other bivalent aromatic groups which have from 6 to 18 carbon atoms and in which from 50 to 100 mol-% of the chain lengthening bonds are coaxial or arranged parallel in opposite directions and from 50 to 0 mol-% are bent at an angle and are unsubstituted or substituted with $C_1$–$C_4$-alkoxy groups or halogen atoms.

5. Polyester according to claim 1 characterised in that Ar consists of 1,4-phenylene groups, 4,4'-diphenylene groups, or both.

6. Polyester according to claim 1 characterised in that Ar consists of a mixture of 1,4-phenylene groups and 4,4'-diphenylene groups in a molar ratio of from 2/1 to ½.

7. Moulded article, filament, fiber, or film which comprises the thermotropic, fully aromatic polyester according to claim 1.

* * * * *